United States Patent
Susnjara

(10) Patent No.: US 9,665,086 B2
(45) Date of Patent: May 30, 2017

(54) METHOD OF PRODUCING A COMPLEMENT OF PARTS REQUIRED FOR ASSEMBLY OF A PRODUCT

(75) Inventor: Jason P. Susnjara, Santa Claus, IN (US)

(73) Assignee: Thermwood Corporation, Dale, IN (US)

( * ) Notice: Subject to any disclaimer, the term of this patent is extended or adjusted under 35 U.S.C. 154(b) by 930 days.

(21) Appl. No.: 12/724,985

(22) Filed: Mar. 16, 2010

(65) Prior Publication Data

US 2011/0231001 A1 Sep. 22, 2011

(51) Int. Cl.
*G06F 17/00* (2006.01)
*G05B 19/4097* (2006.01)

(52) U.S. Cl.
CPC ........... *G05B 19/4097* (2013.01); *G05B 2219/32222* (2013.01); *G05B 2219/35077* (2013.01); *G05B 2219/35188* (2013.01); *Y02P 90/22* (2015.11)

(58) Field of Classification Search
USPC ........ 700/110, 115, 159, 116, 122, 167, 171, 700/175, 83, 84, 186; 101/483
See application file for complete search history.

(56) References Cited

U.S. PATENT DOCUMENTS

| 6,205,370 | B1* | 3/2001 | Blaimschein et al. | 700/134 |
| 6,941,864 | B2* | 9/2005 | Dick et al. | 101/483 |
| 7,206,656 | B2* | 4/2007 | Clayton et al. | 700/171 |
| 2005/0240300 | A1* | 10/2005 | Sigtryggsson et al. | 700/171 |
| 2009/0125143 | A1* | 5/2009 | Bajocich et al. | 700/186 |
| 2010/0275794 | A1* | 11/2010 | Silchenstedt et al. | 101/4 |

* cited by examiner

*Primary Examiner* — Sean Shechtman
(74) *Attorney, Agent, or Firm* — Bookoff McAndrews, PLLC

(57) ABSTRACT

A method of producing a set of parts which may be assembled to form a product generally consisting of programming a CNC machine to selectively execute a first routine to form a set of parts from a first panel of material, and generate a map of the layout of the parts on the first panel, provided with identifying indicia, and a set of labels each provided with machine readable indicia identifying the part and operator readable indicia permitting the operator to identity the part on the map, and a second routine to form selected ones of the set of parts from a second panel of material, loading the first panel on the machine, operating the machine to execute the first routine, attaching each of the generated labels to its corresponding formed part, matching identifying indicia on generated labels and map, removing the set of labeled parts from the worktable, identifying labeled parts deemed defective, machine scanning the machine readable indicia on the labels of produced parts deemed defective, loading a second panel of material on the machine, operating the machine to execute the second routine to reproduce the defective parts and replacing the defective parts with reproduced parts.

20 Claims, 2 Drawing Sheets

METHOD OF PRODUCING A COMPLEMENT OF PARTS REQUIRED FOR ASSEMBLY OF A PRODUCT

This invention relates to a method of producing a set of parts which may be assembled to form a product. The invention further contemplates such a method which additionally provides for expeditiously producing defective and/or missing ones of such set of parts.

BACKGROUND OF THE INVENTION

In the prior art, there has been developed a method of forming a set of parts intended for use in assembling a particular product which generally consists of programming a CNC machine to form the set of parts from panels of material, loading the panels on the worktable of the machine and operating the machine to form the parts. Upon such parts having been produced, they commonly are transported to an assembly area where they are perhaps further machined or otherwise treated, fitted together and possibly finished to provide an end product such as a piece of furniture and the like.

In the course of forming and subsequently handling and assembling such parts, it often occurs that the material from which the part is formed is found to be flawed, the forming of the part may be found to be defective and/or the part becomes misplaced or lost in transit, requiring the reproduction of such part. Since the forming of such flawed, defective or missing part had been accomplished in the course of the formation of the set of parts, the reproduction of any number of such parts less than the full set of parts requires a special forming of the part or parts involving undue time, effort and expense. Accordingly, it is the principal object of the present invention to provide a method of reproducing one or more flawed, defective or missing parts of a set of such parts intended to be assembled to provide a finished product which is expeditious, comparatively effortless and economical.

SUMMARY OF THE INVENTION

In one embodiment of the present invention there is provided a method of producing a set of parts which may be assembled to form a product consisting of programming a CNC machine to selectively execute a first routine to form a set of parts from a first panel of material, and generate a map of the layout of the parts on the first panel, provided with identifying indicia, and a set of labels each provided with machine readable indicia identifying the part and operator readable indicia permitting the operator to identify the part on the map, and a second routine to form selected ones of the set of parts from a second panel of material, loading the first panel of material on a worktable of the machine, operating the machine to execute the first routine, attaching each of the generated labels to its corresponding formed part, matching identifying indicia on the generated labels and map, removing the set of labeled parts from the worktable, identifying labeled parts deemed defective, machine scanning the machine readable indicia on the labels of produced parts deemed defective; loading a second panel of material on the worktable of the machine, operating the machine to execute the second routine to reproduce the defective parts, and replacing the defective parts with the reproduced parts.

In another embodiment of the invention in which one or more formed parts are found to be mislaid or missing, there is provided a variation of the method described which includes programming such a machine to selectively execute a first routine to form a set of parts from a first panel of material, and generate a map of the layout of the parts on the first panel, provided with identifying indicia, and a set of labels each provided with machine readable indicia identifying the part and operator readable indicia permitting the operator to identify the part on the map, a second routine to regenerate the map and labels, and a third routine to form selected ones of the set of parts from a second panel of material. Such method further provides for discerning missing ones of the formed parts, operating the machine to execute the second routine, identifying the reproduced labels corresponding to the missing ones of the formed parts utilizing one of the initially generated or regenerated maps; machine scanning the machine readable indicia on the labels identified as corresponding to the ones of missing parts, loading a second panel of material on the worktable of the machine, operating the machine to execute the third routine to reproduce the missing parts from the second panel and combining the reproduced ones of the missing parts with the nonmissing ones of the set of parts.

In a further embodiment of the invention, the two methods as described are combined to provide for the reproduction of both defective and missing parts.

DETAILED DESCRIPTION OF THE PREFERRED EMBODIMENTS OF THE INVENTION

Figure 1:
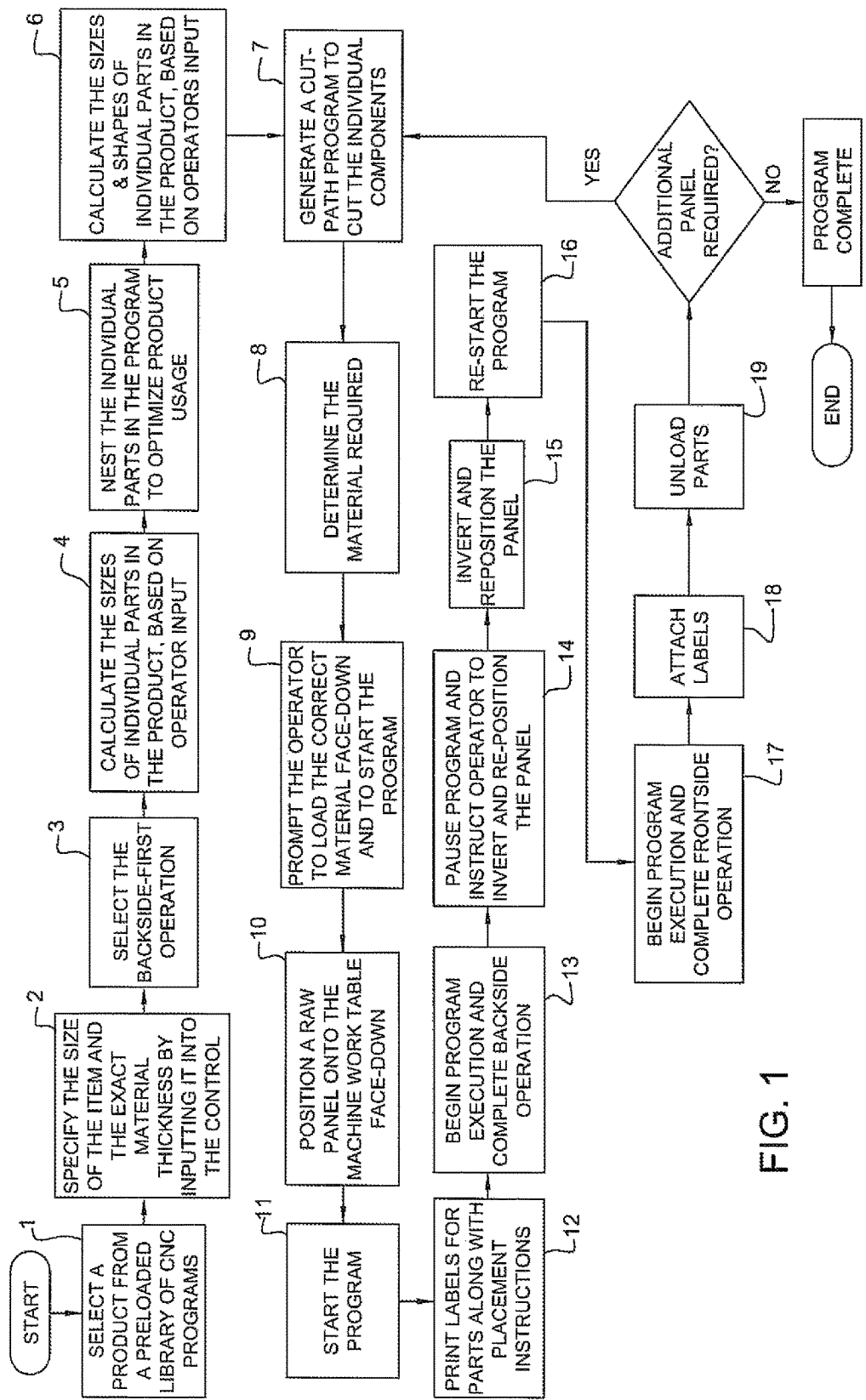
FIG. 1 is a flow diagram of a method for producing a set of parts intended to be assembled to form a particular product.

Referring to the drawings, there is illustrated a pair of flow diagrams depicting a method of forming a set of parts intended to be assembled together to form a product, and further provide for expeditiously, relatively effortlessly and economically reproducing parts originally produced, found to be flawed, damaged or missing, which embodies the present invention. In the embodiment, as an example, it may be assumed that the object of the invention would be to produce a product such as a piece of furniture from one or more panels of wood by the use of a suitably programmed CNC router. Additionally, the router would be suitably programmed to selectively execute a routine to machine and thus form a set of parts of the piece of furniture from one or more panels of wood, and separately execute additional routines to machine and form selected ones of such set of parts also from panels of wood.

To initiate the process, the operator of the machine would select the product to be formed from the parts to be produced by the machine from a preloaded library of programs, specify the dimensions of the product to be formed by the set of parts to be produced by the machine and the thicknesses of such parts, and select a back side of the panel of wood from which such set of parts are to be formed, as shown in steps 1, 2 and 3. The machine would then function to calculate the sizes of the individual parts to be produced, nest the individual parts on the selected panel of material from which the parts are to be formed to optimize material usage, calculate the sizes and shapes of the parts to be formed, generate a cut path to form the set of parts, determine the material required to form such parts and then prompt the operator to load the specified panel of material on the worktable of the machine, as indicated in steps 4 through 9. The operator would then load and position on the worktable of the machine, the panel of material specified by the machine, and then restart the machine, as indicated in steps 10 and 11. The machine would then proceed to print certain labels to be attached to the parts to be formed by the machine, and certain instructions in terms of the manner in which such labels are to be attached to the formed parts, usually in the form of a map, as indicated in step 12. In steps 13 and 14, the machine would then begin executing the program to perform the prescribed machining operations on the selected back side of the panel positioned on the worktable of the machine, pausing upon completion to instruct the operator to invert and reposition the panel partially machined. In steps 15 and 16 the operator inverts and repositions the panel on the worktable of the machine and restarts the machine to complete the machining operations on the upper side of the panel. In step 17, the machine functions to machine the inverted, upper side of the panel positioned on the worktable of the machine. Upon completion of the machining operation, utilizing the instructions generated by the machine, the operator applies the labels also generated by the machine on the completed parts positioned on the worktable, as depicted in steps 18 and 19. If additional panels are required to complete the full set of parts to be formed, method steps 7 through 19 would be repeated.

Upon completion of the full set of parts, the parts with labels attached are removed from the worktable of the machine, assembled together and transported to an assembly area, and unused panel portions are discarded by scarping or otherwise.

The indicia imprinted on the labels applied to the parts formed on the machine contain information pertinent to the nature, use and identification of each of the parts. Such indicia would include the nature of the material from which the part is made such as the type of wood, the particular lot or product to which the part relates to facilitate the separation and assembly of the parts for a particular product, any additional procedure to be performed on the part and an identification of such part in the event that replacement of the part may be required. The indicia identifying the part is in the form of machine readable bar code.

Figure 2:
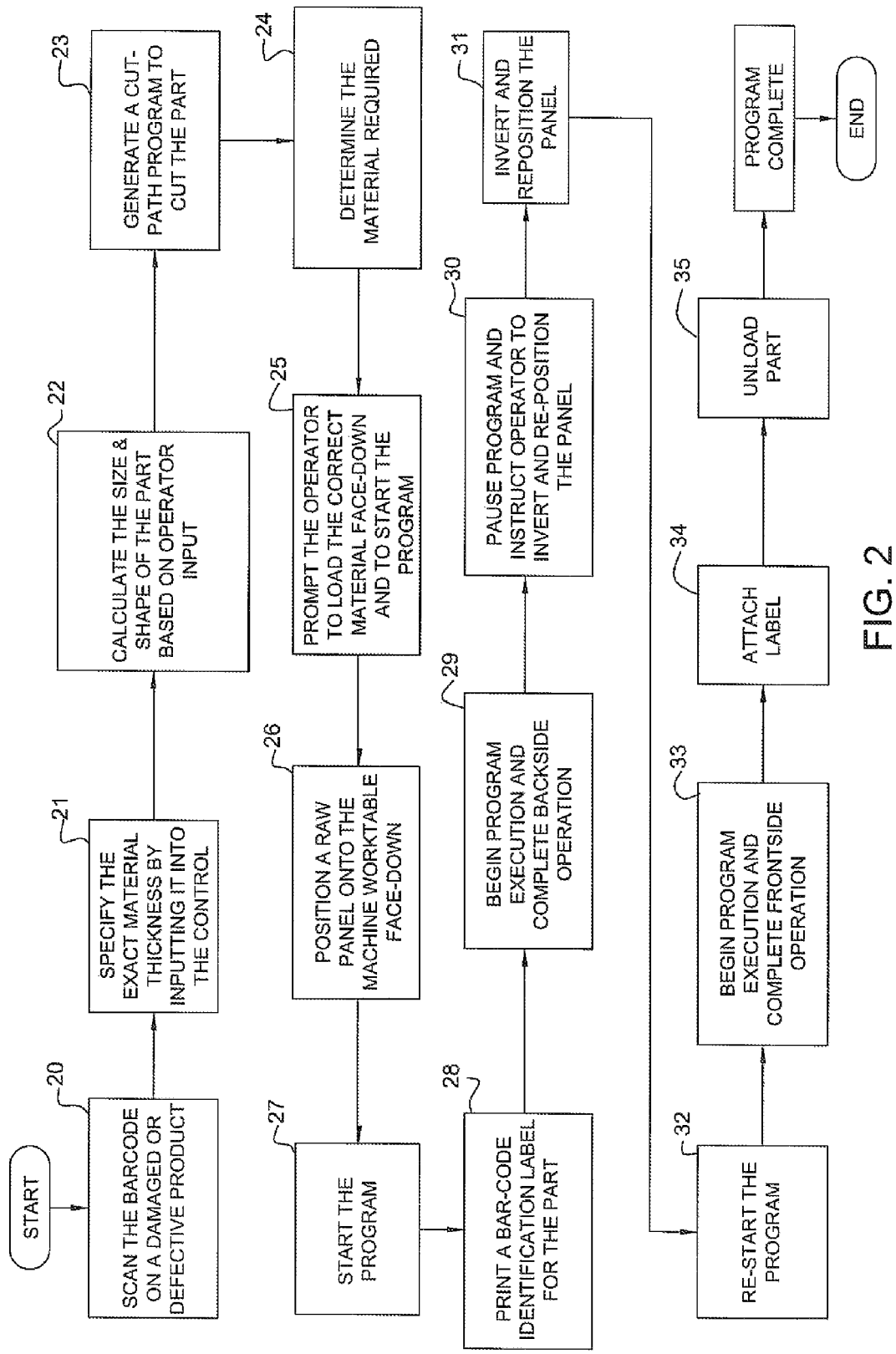
FIG. 2 is a flow diagram of a method for reproducing individual parts of the set of parts produced by the method provided in FIG. 1 which have found to be unsuitable for use by reason of having been formed of a flawed material and/or defectively machined or damaged in subsequent handling.

After the set of parts has been formed in the manner as described and it is determined either by the machine operator or subsequent handling personnel that a particular part is flawed or damaged, such part may be readily reproduced by returning it to the machine operator who would undertake to replace the part through the use of the method depicted in FIG. 2 of the drawings. In undertaking to reproduce the flawed or damaged part, the operator would first machine scan the bar code on the label of the part to identify the part for the machine, and specify the material thickness of the part as shown in steps 20 and 21. The machine would then calculate the size and shape of the part to be reproduced, generate a cut path program for the part, determine the material required and then prompt the operator to load the prescribed material on the worktable of the machine, as indicated in steps 22 through 25. The operator would then position the prescribed panel of material on the worktable of the machine and restart the program as provided in steps 26 and 27. The machine would then operate as previously described to print a bar coded identification for the part, begin execution of the program to complete one side of the panel and then pause the operation and instruct the operator to invert and reposition the panel on the worktable of the machine as indicated in steps 28, 29 and 30. Prompted by the machine, the operator would then invert and reposition the panel on the worktable of the machine, and restart the program as indicated in steps 31 and 32. The machine then would be restarted to complete the machining operation on the upper side of the part being produced, and the operator would attach the label generated by the machine and unload the finished part in the manner as previously described, as indicated in steps 34 and 35. Such replacement part then would be transported to the assembly area for use in completing the assembly of the product to which the part relates.

In another embodiment of the invention providing for the reproduction of missing ones of the initially produced parts, the machine would be programmed to selectively execute a first routine to form the set of parts from a first panel of material, and generate a map of the layout of the parts on the second panel, provided with identifying indicia, and a set of labels each provided with machine readable indicia identifying the part and operator readable indicia permitting the operator to indentify the part on the map, a second routine to regenerate the map and labels, and a third routine to form selected ones of the set of parts from a second panel of material. The procedure as previously described would be repeated but varied to provide for discerning missing ones of the formed parts, operating the machine to execute the second routine, identifying the reproduced labels corresponding to the missing ones of the formed parts utilizing one of the initially generated or regenerated map, machine scanning the machine readable indicia on the labels identified as corresponding with the ones of missing parts, loading a second panel of material on the worktable of the machine, operating the machine to execute the third routine to reproduce the missing parts from the second panel of material and then combining the reproduced ones of the missing parts with the nonmissing ones of the set of parts.

With the machine suitably programmed and operated as described, defective parts, missing parts, and combinations of defective and missing parts may be expeditiously, relatively effortlessly and economically be reproduced to facilitate the production of the desired products.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A method of producing a set of parts, which, when assembled, form a product, the method comprising:
   programming a CNC machine to selectively execute a first routine and a second routine, wherein the first routine comprises:
   generating a cut path to form the set of parts from a first panel of material;
   generating a map depicting a layout of the set of parts to form the set of parts from the first panel of material, wherein each part of the set of parts on the map has an indicia identifying the respective part of the set of parts;
   generating a set of labels, wherein each label of the set of labels has a machine readable indicia identifying one part of the set of parts and an operator readable indicia for an operator to identify the one part of the set of parts relative to the map; and forming the set of parts from the first panel of material; wherein the second routine comprises:

forming one or more parts of the set of parts from a second panel of material;

loading the first panel of material on a worktable of the CNC machine, wherein the cut path is generated prior to loading the first panel of material;

operating the CNC machine to execute the first routine;

attaching each label of the generated set of labels to its corresponding formed part by matching the identifying indicia on the map with the operator readable indicia on each label of the set of labels;

removing the set of parts, once labeled, from the worktable;

identifying any labeled parts deemed defective;

machine scanning the machine readable indicia on any labels of produced parts deemed defective;

loading the second panel of material on the worktable;

operating the CNC machine to execute the second routine to produce a set of replacement parts consisting of only parts to replace the defective parts from the set of parts formed during the first routine; and replacing the defective parts of the set of parts formed during the first routine with the produced set of replacement parts.

2. The method of claim 1, wherein each label of the set of labels has an adhesive surface for detachably securing each label to the respective part of the set of parts.

3. The method of claim 1, wherein each label of the set of labels includes an additional indicia indicating at least one of: (i) a side of the respective part requiring operations, (ii) the product to which the part relates, and (iii) a disposition of the part in the product.

4. The method of claim 1, wherein the machine readable indicia is a bar code.

5. The method of claim 1, wherein the first routine comprises performing a first set of machining functions on a first side of the first panel of material and second set of machining functions on an inverted side of the first panel of material.

6. The method of claim 5, wherein the first set of machining functions comprises nonsevering functions, and the second set of machining functions comprises severing functions.

7. The method of claim 6, wherein the first set of machining functions includes forming at least one of an indentation and a through opening.

8. The method of claim 6, wherein the first set of machining functions on the first panel of material includes severing a part not requiring a machining function on the inverted side thereof.

9. The method of claim 1, wherein the first routine comprises nesting the set of parts on the first panel of material for increasing utilization of the first panel of material when producing the set of parts.

10. The method of claim 1, wherein the machining functions include at least one of routing, drilling, and sawing.

11. A method of producing a set of parts, which, when assembled, form a product, the method comprising:

programming a CNC machine to selectively execute a first routine, a second routine, and a third routine, wherein the first routine comprises:

generating a cut path to form the set of parts from a first panel of material;

generating a map depicting a layout of the set of parts to form the set of parts from the first panel of material, wherein each part of the set of parts on the map has an indicia identifying the respective part of the set of parts;

generating a set of labels, wherein each label of the set of labels has a machine readable indicia identifying one part of the set of parts and an operator readable indicia for an operator to identify the one part of the set of parts relative to the map; and forming the set of parts from the first panel of material; wherein the second routine comprises:

regenerating the map and regenerating the labels; and wherein the third routine comprises:

forming one or more parts of the set of parts from a second panel of material;

loading the first panel of material on a worktable of the CNC machine, wherein the cut path is generated prior to loading the first panel of material;

operating the CNC machine to execute the first routine;

attaching each label of the generated set of labels to its corresponding formed part by matching the identifying indicia on the map with the operator readable indicia on each label of the set of labels;

removing the set of parts, once labeled, from the worktable;

discerning any parts missing from the formed set of parts;

operating the CNC machine to execute the second routine;

identifying the labels corresponding to the missing parts utilizing at least one of the map generated during the first routine or the map regenerated during the second routine;

machine scanning the machine readable indicia on the labels identified as corresponding to the missing parts;

loading the second panel of material on the worktable;

operating the CNC machine to execute the third routine to produce a set of replacement parts from the second panel of material, wherein the set of replacement parts consists of only the parts missing from the set of parts formed from the first panel of material; and combining the set of replacement parts with the set of parts formed from the first panel of material.

12. The method of claim 11, wherein each label of the set of labels has an adhesive surface for detachably securing each label to the respective part of the set of parts.

13. The method of claim 11, wherein each label of the set of labels includes an additional indicia indicating at least one of: (i) a side of the respective part requiring an operation, (ii) the product to which the parts relates, and (iii) a disposition of the part in the product.

14. The method of claim 11, wherein the machine readable indicia is a bar code.

15. The method of claim 11, wherein the first routine comprises performing a first set of machining functions on a first side of the first panel of material and a second set of machining functions on an inverted side of the first panel of material.

16. The method of claim 15, wherein said first set of machining functions comprises nonsevering functions and the second set of machining functions comprises severing functions.

17. The method of claim 11, wherein the first routine comprises nesting the set of parts on the first panel of material for increasing utilization of the first panel of material when producing the set of parts.

18. The method of claim 11, wherein the machining functions include at least one of routing, drilling, and sawing.

19. A method of producing a set of parts, which, when assembled, form a product, the method comprising:
    programming a CNC machine to selectively execute a first routine, a second routine, and a third routine, wherein the first routine comprises:
        generating a cut path to form the set of parts from a first panel of material;
        generating a map depicting a layout of the set of parts to form the set of parts from the first panel of material, wherein each part of the set of parts on the map has an indicia identifying the respective part of the set of parts;
    generating a set of labels, wherein each label of the set of labels has a machine readable indicia identifying one part of the set of parts and an operator readable indicia for an operator to identify the one part of the set of parts relative to the map; and
    forming the set of parts from the first panel of material;
    wherein the second routine comprises:
        regenerating the map and regenerating the labels; and
    wherein the third routine comprises:
        forming one or more parts of the set of parts from a second panel;
    loading the first panel of material on a worktable of the CNC machine, wherein the cut path is generated prior to loading the first panel of material;
    operating the CNC machine to execute the first routine;
    attaching each label of the generated set of labels to its corresponding formed part by matching the identifying indicia on the map with the operator readable indicia on each label of the set of labels;
    removing the set of parts, once labeled, from the worktable;
    discerning any parts of the set of parts that are defective or missing;
    operating the CNC machine to execute the second routine in circumstances in which a missing part is discerned;
    identifying any regenerated labels corresponding to any missing parts utilizing at least one of the map generated during the first routine or the map regenerated during the second routine;
    machine scanning the machine readable indicia on the labels of any defective parts and the regenerated labels of any missing parts;
    loading the second panel of material on the worktable;
    operating the CNC machine to execute the third routine to produce a set of replacement parts consisting of only parts to replace the missing parts and parts to replace the defective parts from the set of parts formed during the first routine; and
    combining the replacement parts with the set of parts formed from the first panel of material that were not discerned as defective.

20. The method of claim 19, wherein the first routine comprises nesting the set of parts on the first panel of material for increasing utilization of the first panel of material when producing the set of parts.

\* \* \* \* \*